July 17, 1923.

E. M. CAVANAGH ET AL 1,461,968

AIR BRAKE FOR TRAINS

Filed Feb. 7, 1922

Edward M. Cavanagh,
Robt. E. McFarlane,
INVENTORS.

BY E.H.Bond

ATTORNEY

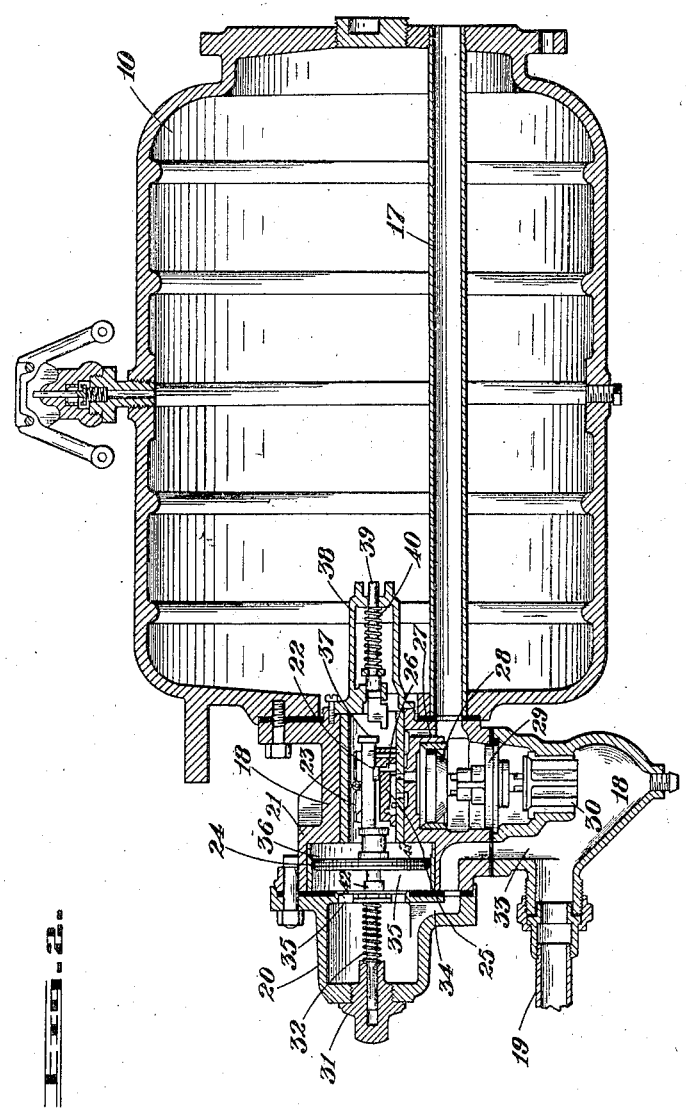

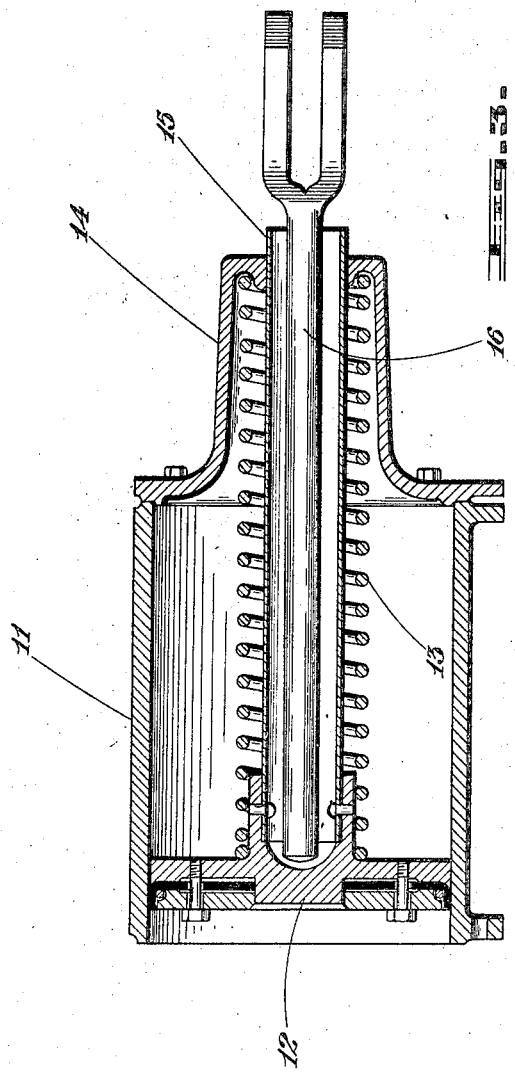

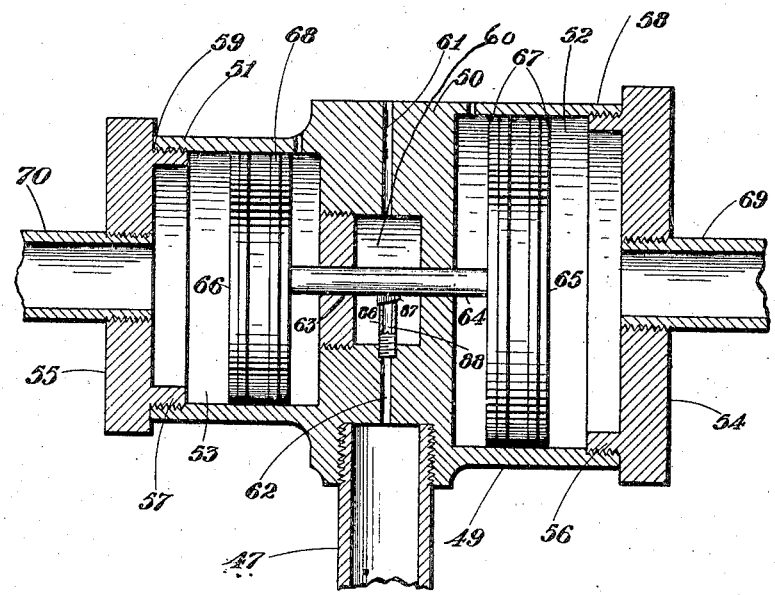
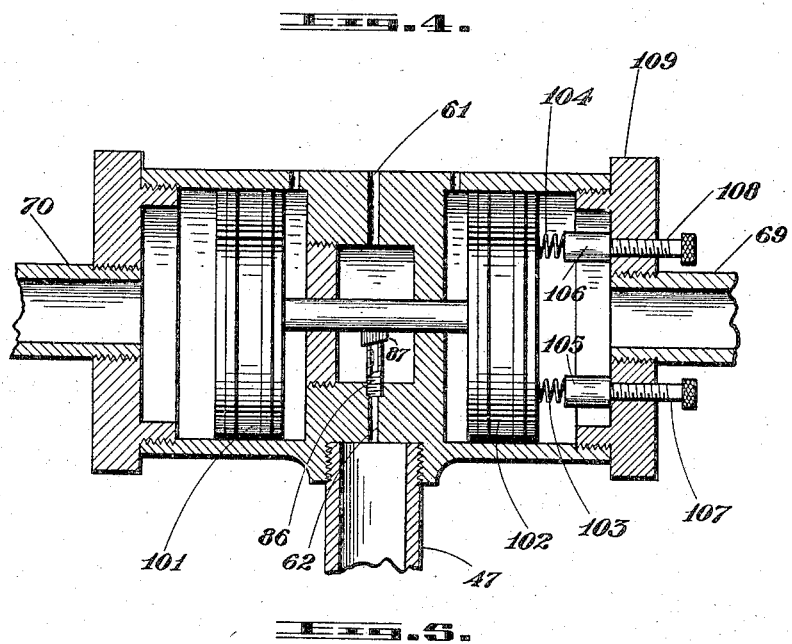

Patented July 17, 1923.

1,461,968

UNITED STATES PATENT OFFICE.

EDWARD M. CAVANAGH AND ROBERT E. McFARLANE, OF OTTAWA, ONTARIO, CANADA.

AIR BRAKE FOR TRAINS.

Application filed February 7, 1922. Serial No. 534,807.

*To all whom it may concern:*

Be it known that we, EDWARD M. CAVANAGH and ROBERT E. MCFARLANE, citizens of the Dominion of Canada, and each a resident of Ottawa, in the county of Carleton and Province of Ontario, have invented certain new and useful Improvements in Air-Brakes for Trains, of which the following is a specification.

The present invention relates to automatic retainer valves for railway air brake system and the principal object is to provide means, whereby the brakes are held set, until the auxiliary air reservoir is charged to maximum capacity.

Another object of the invention is to provide a device of the character described, by the use of which, the train is at all times under control and which will prevent the running away of trains.

With these and other objects in view, the invention consists in the construction, combination and arrangement of parts as will be hereinafter fully described, illustrated in the accompanying drawings, and pointed out in the claim hereunto appended.

In the drawings:

Fig. 2 is a longitudinal sectional view of the auxiliary air reservoir and triple control valve with the latter in full service position.

Fig. 3 is a longitudinal vertical sectional view of the brake cylinder and piston, with the brake rod in elevation.

Fig. 4 is a vertical section of the automatic retainer valve, and

Fig. 5 is a similar view of a modified form of automatic retainer valve.

Referring to the drawings like numerals designate like parts in the various drawings.

Figure 1:
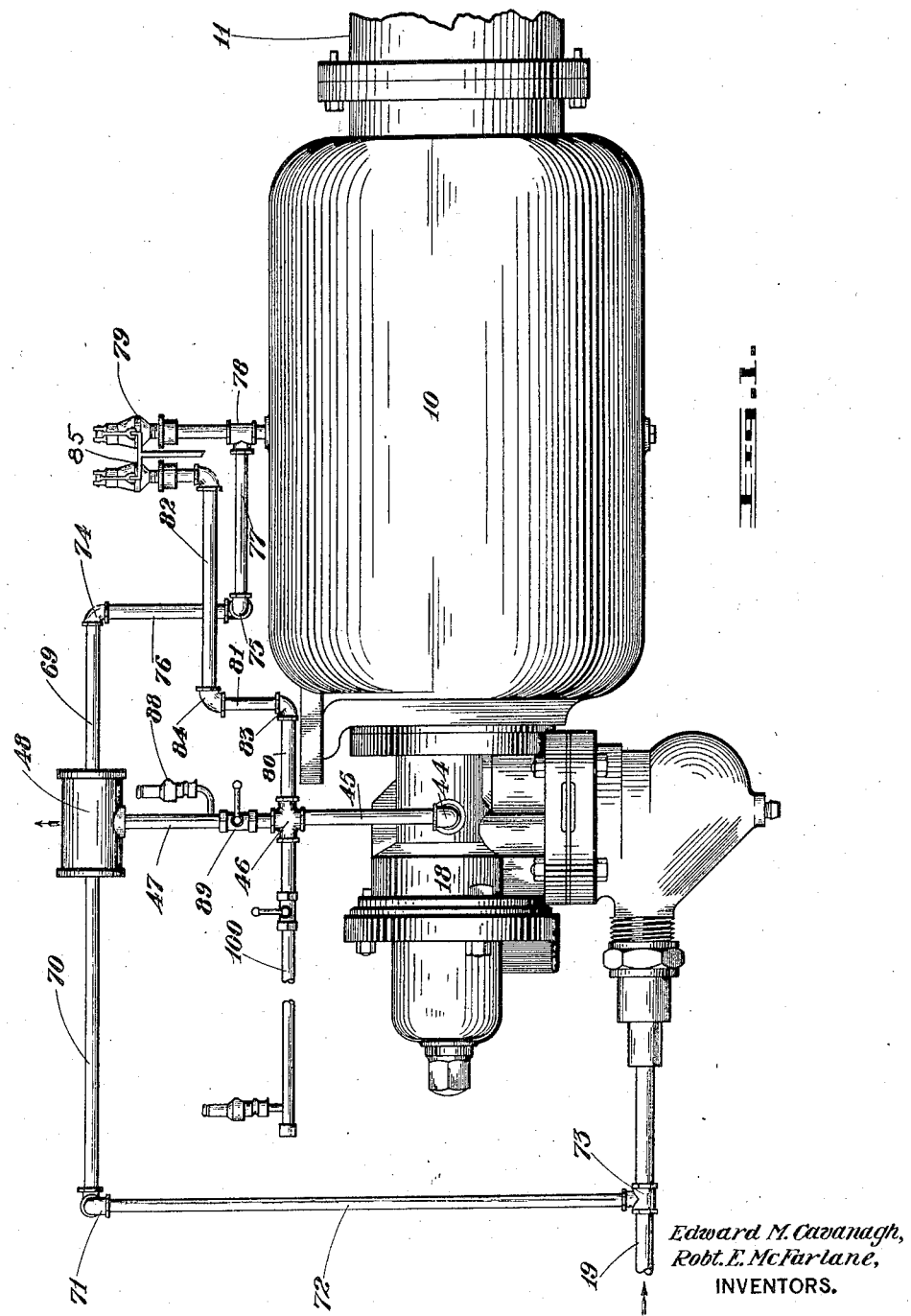
Figure 1 is a side elevational view of an auxiliary air reservoir and triple valve of a train line with the automatic retainer valve attached thereto.

In the air brake systems now in use, the engineer has no power to hold the brakes set until the auxiliary reservoir is fully charged and the automatic retainer takes the place of the manually operated retainer.

As the improved retaining valve is adapted for attachment to the air brake apparatus in order to set the wheel brakes, until the auxiliary air reservoir is fully charged, a brief description of the operation of the brake mechanism will be given.

Figures 1 and 2 illustrate an auxiliary reservoir 10 in which the air is stored for use in the brake cylinder 11 and its use is confined to the car on which it is located.

A piston 12 is operated by the air pressure from the auxiliary cylinder 10 in applying the brakes, 13 is the release spring and in applying the brakes, the air enters the brake cylinder 11 and forces the piston 12 outwardly and resultantly the spring 13 is compressed. In releasing the brake, the air leaves the brake cylinder 11 and the release spring 13 forces piston 12 back to release position as illustrated in Figure 3. 14 is the front cylinder head and the same acts as a guide for the sleeve 15, which encloses the pull rod 16 connected to the brake shoe actuating mechanism.

An auxiliary tube 17 extends through the auxiliary reservoir 10 and connects the triple control valve 18 direct with the brake cylinder 11 and when the brake is released, the brake cylinder air flows back through the tube 17 and through the triple valve exhaust to the atmosphere in the manner more fully described.

A pipe 19 is connected to the check valve casing 18' of the triple valve 18 and leads from the engine reservoir, not illustrated.

The triple valve 18 consists of the cylinder cap 20, triple body 21, the slide valve 22, movable with the main piston 24, slide valve spring 23 and the triple piston 24 having a suitable packing ring mounted thereon. A valve 25 is arranged below the slide valve 22 and controls the air from the triple valve into the auxiliary tube 17 through ports 26 and 27. An emergency valve 28 has a seat 29 and a check valve 30 extends downwardly within the check valve casing 18'.

The triple control valve 18 consists of two distinct mechanisms, firstly the triple piston 24, slide valve 22 and graduating valve 25 together with the stem 31 and spring 32, this mechanism being used in making service stops and releasing brakes, or what is known as the service part of the triple.

The other mechanism comprises the emergency valve 28 and check valve 30, which latter are only used in an emergency application of the brakes, so no further description is necessary of the same, as this construction so far described is already in operation.

The air passes from the branch pipe 19 into the lower sections 18′ of the triple valve 18 and flows through passages 33, 34, ports 35 and on through the feed groove 36 into chamber 37 and thence through the retarding casing 38, which extends into the auxiliary reservoir 10. This casing 38 contains the retarding stem 39 and spring 40. The parts 39 and 40 govern the movement of the triple piston 24 and slide valve 22 between the release and retarded piston. When the pressure on the outer face of the piston 24 exceeds that of the inner side for example 3 pounds, the tension of the retarding spring 40 will be overcome and the triple piston 24 and slide valve 22 will be moved to released position. As the auxiliary cylinder fills pressure increases and the difference of pressure on the two faces of the piston equalizes, the retarding stem 39 and spring 40 will return the piston and valve to full released position.

As will be understood, the air pressure in the triple valve 18 is the same as that of the auxiliary reservoir 10 and these pressures are constantly maintained by virtue of equalization.

Initially the auxiliary reservoir 10 carries its maximum pressure, approximately 70 pounds and the triple valve likewise is under similar pressure. Resultant of even pressure of air on both sides of the triple piston 24, the latter is held on seat 41. However, there is a constant passage of air through the feed groove 36 and this air passes into the auxiliary reservoir 10 and serves to maintain the maximum pressure therein.

When the brakes are to be set, sufficient air pressure is exhausted through branch pipe 19 to the atmosphere. As the pressure on the triple valve outer side of the piston 24 is reduced, the said valve moves out until the knob 42 touches the end of the graduating stem 31, after which further movement is prevented. The slide valve 22 has uncovered port 26 and the requisite pressure of air will flow through port 27 into the auxiliary tube 17. This air which passes through tube 17 forces back the push rod 16 and applies the brakes.

When the brakes are to be released, air is first admitted to the triple valve to restore the maximum pressure to the same to equalize with that of the auxiliary reservoir 10, and this pressure forces the piston 24 back to seat 41. A part of this air equivalent to that expanded by the auxiliary reservoir flows past the piston 24, thereby restoring the maximum capacity of the said reservoir.

As it is necessary to maintain a maximum pressure of air in the auxiliary reservoir 10, as the same is constantly loosing its pressure through numerous breakings or stops, I have provided an attachment to the above described system which prevents the release of the brake cylinder until the air pressure in the auxiliary cylinder 10 has resumed normal.

In this connection, it may be stated that heretofore, the air released from the brake cylinders has passed back through tube 17 to a port in the triple valve 18 to the atmosphere.

That the danger of releasing the brakes before the restoration of the maximum air pressure in the auxiliary reservoir 10 is manifest. For example, a heavy train is travelling on a roadbed where numerous slow downs are occasioned due to different grades or curves are encountered. The brakes are set and released a number of times, thereby lowering the pressure in the auxiliary reservoir 10, and not enough time has elapsed to restore the maximum pressure in the said reservoir. If an abrupt stop is necessary, there is not enough air in the auxiliary reservoir 10 to function the brakes, therefore a wreck or possible derailment is liable to occur.

To overcome this defect, I provide, as illustrated more particularly in Figure 1 the following attachment which will now be described.

As heretofore stated, the air pressure from the brake cylinder 11, is exhausted into the atmosphere through a port in the triple valve 18 when the brake is released. This port is tapped for an elbow connection 44 to which is attached a pipe 45. This pipe has a union connection 46 with a pipe 47 which communicates with the automatic air retainer valve 48, the operation of which will later be more fully described. This valve 48 comprises a cylindrical casing 49 having a centrally disposed wall 50, while the valve casing 49 extends in the same plane, but diametrically opposite to that of the extension 51. The casing 49 and extension 51 are formed with chambers 52 and 53, the former being relatively larger of the two. The caps 54 and 55 are formed with annular exteriorly threaded flanges 56 and 57 which are screwed into the open threaded ends 58 and 59 of the casing 49 and extension 51 of the retaining valve. The casing wall 50 is formed with a centrally disposed chamber 60 into which opens the vertical ports 61 and 62, the former opening into the atmosphere, while the latter communicates directly with the exhaust pipe 47. Likewise the casing wall 50 is provided with transverse bore 63 which intersects the chamber 60 and slidably mounted in said bore 63 is a rod 64 the ends of which project within the side chambers 52 and 53. Pistons 65 and 66 are connected to the ends of shaft 64 and carry suitable packing rings 67 and 68. The pistons 65 and 66 are adapted for reciprocation in their respective chambers 52 and 53 to regulate the exhaust from the brake cylinder. Caps 54 and 55 have central threaded openings in which are mounted the threaded ends of the pipes 69 and 70. Pipe 70 has elbow connection 71 with a pipe 72 which latter is joined by the union 73 with the brake pipe 19. Pipe 69 has elbow connection 74 and 75 with pipes 76 and 77. The pipe 77 has a union connection 78 with a bleed cock 79 on one side and communication with the auxiliary cylinder 10 on the other side. Pipes 80, 81 and 82 have elbow connections 83 and 84 and carry a second bleed cock 85. This bleed cock 85 therefore is connected by pipes 80, 81 and 82 to the union 46 on the exhaust pipe 47.

A tube 86 has its upper end beveled and its lower end seated in a counter-sink in the wall 50 of the retainer valve 48 and extends within the central chamber 60. This tube 86 communicates with port 62 and pipe 47 through which the brake cylinder exhaust is passed.

The piston rod 64 has formed on its lower surface at the medial point, a valve 87, having a lower beveled surface 88. This valve 87 is adapted to normally seat upon the beveled upper end of the tube 86, to prevent the escape of the brake cylinder exhaust through pipe 47 and tube 86.

To illustrate the operation, the auxiliary reservoir 10 has its maximum air pressure and the piston 24 contacts with seat 41 of the triple valve. A reduction is made by exhausting air from the triple valve 18 through the branch pipe 19. As the pressure in the triple valve 18 is reduced below that of the auxiliary reservoir 10, the piston 24 is moved to service position as illustrated in Figure 2. This operation moves the slide valve 22 and uncovers the port 26 allowing a quantity of air to pass through port 27 to the auxiliary tube 17. This air passes through the auxiliary tube 17 and forces piston 12 in the brake cylinder 11 outwardly, thus actuating the brake pull rod 16 to set the brakes. As the pressure in the auxiliary reservoir 10 has been reduced below that of the triple valve and it is necessary to maintain the same at uniform pressure, air pressure will be induced through branch pipe 19 to the triple valve 18 and at the same time through pipes 72 and 70 to the automatic retaining valve 48. Meanwhile, the piston 24 has returned to seat 41 and the port 26 is closed by the slide valve 22. The induced air entering chamber 53 of the retaining valve 48 forces the small piston 63 inwardly thereby moving rod 64 and the valve 87 over the end of tube 86 to cover the same. The air from the brake cylinder 11 upon release of the brake, passes back through the tube 17 and into pipes 45 and 47 to tube 86, but its escape is blocked by the valve 87 on rod 64 in the retaining valve. As heretofore stated, the exhaust in the ordinary air brake systems, is passed to the atmosphere, regardless of the pressure contained in the auxiliary reservoir 10 and where there is the necessity for numerous and consecutive braking operations, the pressure in the auxiliary reservoir 10 is reduced to a point, where further braking is prevented, until the air pressure of the auxiliary reservoir 10 is replenished and returned to normal.

As the brake exhaust is prevented from escaping into the atmosphere through the retainer valve, until the pressure in the auxiliary reservoir has attained maximum capacity, means are provided for automatically releasing the exhaust when such capacity is attained, as follows. The pressure of air on the pistons 65 and 66 is unequaled as piston 65 has greater contact being larger than piston 66. The air from the cylinder 10 passes out through pipes 77—76 and 69 into the chamber 52 of the retainer valve 48 and forces piston 65 outwardly, thus moving the stop valve 87 from over the tube 86 to allow the exhaust air from the brake cylinder to pass through the retainer valve 48, through port 61 to the atmosphere.

Upon the next air feed through branch pipe 19, the piston 24 will be forced back to seat 41, simultaneously with the forcing back of piston 66 in the retainer valve 48 to cause the valve 87 to cover the exhaust tube 86, to seal the exhaust. After another braking operation, the operation is repeated, but no exhaust can escape into the atmosphere after a braking operation until the reservoir 10 has its maximum pressure.

A pressure operated retainer valve 88 is connected to the exhaust pipe 47 which may be set in operation to only maintain a pressure of 15 pounds.

Pipe 100 is the original exhaust or retainer pipe which is in operation at the present time. This pipe is provided with cutout cock which must be closed when automatic retainer is being used.

In Figure 5, a modified form of the retainer valve is illustrated in which both pistons 101 and 102 have equal pressure area, but in order to increase the pressure area of piston 102, without increasing its surface area, I have provided the coil springs 103 and 104 which are suitably attached to the collars 105 and 106 on the screws 107 and 108 in the cap 109. This is operated in the same manner as the retainer valve 48 and may be regulated by adjusting the screws 107 and 108.

It is obvious that after a reduction has been made in the train line, the retainer valve is in release position until the brakes are released. When the pressure for the train line comes in contact with the retainer valve it closes communication with the atmosphere and holds the brake set, until the auxiliary reservoir becomes fully charged.

Owing to piston 65 having larger contact surface than piston 66, the pressure from the auxiliary reservoir forces the same outwardly and opens communication to the atmosphere.

From the foregoing it is thought that the construction of my invention will be clearly understood, and, therefore, a more extended explanation has been omitted.

What we claim as new is:

In combination with a railway air brake system, pressure operated retainers, pipe connections between the triple valve and controlling valve, pipe connections between the auxiliary cylinder and said controlling valve, pipe connection between said controlling valve and the regular train pipe line, said controlling valve consisting of a head, cylinders formed in each end of said head, pistons reciprocally positioned in said cylinders, a connecting piston rod between said pistons, an air chamber between said cylinders, an intake opening from the first said pipe connection, an exhaust opening from said air chamber, a valve member carried by said piston rod to control said intake opening, said valve member consisting of a tapered block adapted to normally seat upon the beveled end of the pipe and to close the first said pipe connection and to be controlled by relative pressure of the air in the other said pipe connections on said pistons.

In testimony whereof we affix our signatures in the presence of two witnesses.

EDWARD M. CAVANAGH.
ROBT. E. McFARLANE.

Witnesses:
M. McMILLAN,
R. SLONEMSKY.